United States Patent
Pandzik

(10) Patent No.: US 8,863,534 B2
(45) Date of Patent: Oct. 21, 2014

(54) DIRECT DRIVE SYSTEM WITH BOOSTER COMPRESSOR

(75) Inventor: Richard T Pandzik, Syracuse, NY (US)

(73) Assignee: Carrier Corporation, Farmington, CT (US)

( * ) Notice: Subject to any disclaimer, the term of this patent is extended or adjusted under 35 U.S.C. 154(b) by 423 days.

(21) Appl. No.: 13/146,504

(22) PCT Filed: Feb. 4, 2010

(86) PCT No.: PCT/US2010/023175
§ 371 (c)(1),
(2), (4) Date: Jul. 27, 2011

(87) PCT Pub. No.: WO2010/091166
PCT Pub. Date: Aug. 12, 2010

(65) Prior Publication Data
US 2011/0283721 A1 Nov. 24, 2011

Related U.S. Application Data

(60) Provisional application No. 61/150,093, filed on Feb. 5, 2009.

(51) Int. Cl.
| | | |
|---|---|---|
| F25B 1/00 | (2006.01) | |
| F02B 67/06 | (2006.01) | |
| F25B 1/10 | (2006.01) | |
| B60H 1/00 | (2006.01) | |
| B60H 1/32 | (2006.01) | |

(52) U.S. Cl.
CPC . *F02B 67/06* (2013.01); *F25B 1/10* (2013.01); *B60H 1/00428* (2013.01); *F25B 2600/0253* (2013.01); *F25B 2400/0401* (2013.01); *B60H 1/3222* (2013.01)
USPC .............................................. 62/115; 62/510

(58) Field of Classification Search
CPC ............. F25B 49/022; F25B 2400/075; F25B 213/00; F25B 13/00; F25B 41/04; F25B 2600/0261; F25B 49/02; F25B 2400/13; F25B 1/10; F25B 2600/0253; F25B 2400/0401; A23G 9/16; A23G 9/22; B60H 1/00371; B60H 2001/00235; B60H 1/323; B60H 1/00426; B60H 1/3222; F02B 67/06; F02B 1/10
USPC ............. 62/115, 510, 175, 244, 228.3, 196.1, 62/196.3
See application file for complete search history.

(56) References Cited

U.S. PATENT DOCUMENTS

| 3,841,108 A | 10/1974 | Pierrat |
|---|---|---|
| 3,848,422 A * | 11/1974 | Schibbye .......................... 62/84 |

(Continued)

FOREIGN PATENT DOCUMENTS

| CN | 1661307 A | 8/2005 |
|---|---|---|
| EP | 1285791 | 2/2003 |

(Continued)

OTHER PUBLICATIONS

International Preliminary Report on Patentability issued Aug. 9, 2011.

(Continued)

*Primary Examiner* — Mohammad M Ali
(74) *Attorney, Agent, or Firm* — Cantor Colburn LLP

(57) ABSTRACT

A transport refrigeration system with a direct drive compressor arrangement is provided with a variable speed electrically driven booster compressor that operates in series with the direct drive compressor. The speed of the booster compressor is controlled to either boost or decrease the system capacity. The booster compressor also acts to regulate the flow of refrigerant from the evaporator during periods of operation in which the direct drive compressor might otherwise become overloaded.

7 Claims, 1 Drawing Sheet

(56) References Cited

U.S. PATENT DOCUMENTS

| | | | |
|---|---|---|---|
| 3,976,458 A * | 8/1976 | Krug | 62/175 |
| 4,151,724 A * | 5/1979 | Garland | 62/175 |
| 4,325,223 A * | 4/1982 | Cantley | 62/126 |
| 4,439,997 A * | 4/1984 | Cantley | 62/175 |
| 4,594,858 A | 6/1986 | Shaw | |
| 4,720,980 A * | 1/1988 | Howland | 62/81 |
| 4,748,820 A | 6/1988 | Shaw | |
| 4,787,211 A | 11/1988 | Shaw | |
| 4,942,734 A | 7/1990 | Markbreiter et al. | |
| 4,947,655 A | 8/1990 | Shaw | |
| 4,947,657 A * | 8/1990 | Kalmbach | 62/236 |
| 5,396,779 A * | 3/1995 | Voss | 62/196.2 |
| 5,522,233 A | 6/1996 | Nares et al. | |
| 5,582,022 A | 12/1996 | Heinrichs et al. | |
| 5,927,088 A | 7/1999 | Shaw | |
| 6,076,368 A | 6/2000 | Noble | |
| 6,109,045 A * | 8/2000 | Takenaka | 62/175 |
| 6,276,148 B1 | 8/2001 | Shaw | |
| 6,678,972 B2 * | 1/2004 | Naruse et al. | 37/466 |
| 7,080,521 B2 | 7/2006 | Ludwig et al. | |
| RE39,625 E | 5/2007 | Shaw | |
| 7,254,956 B2 | 8/2007 | Matonog et al. | |
| 7,814,964 B2 * | 10/2010 | Greer | 165/42 |
| 8,419,512 B2 * | 4/2013 | Creed et al. | 454/139 |
| 2001/0005991 A1 | 7/2001 | Niimi et al. | |
| 2003/0068232 A1 | 4/2003 | Iwanami et al. | |
| 2007/0186582 A1 | 8/2007 | Guillard | |
| 2008/0085672 A1 * | 4/2008 | Creed et al. | 454/69 |
| 2008/0173034 A1 * | 7/2008 | Shaw | 62/160 |

FOREIGN PATENT DOCUMENTS

| | | |
|---|---|---|
| EP | 1790921 | 5/2007 |
| GB | 978100 | 12/1964 |

OTHER PUBLICATIONS

International Search Report and Written Opinion mailed Sep. 10, 2010.

* cited by examiner

US 8,863,534 B2

DIRECT DRIVE SYSTEM WITH BOOSTER COMPRESSOR

CROSS REFERENCE TO RELATED APPLICATION

This application claims priority to U.S. Provisional Patent Application Ser. No. 61/150,093 entitled "Direct Drive System with Booster Compressor," filed on Feb. 5, 2009. The content of this application is incorporated herein by reference in its entirety.

TECHNICAL FIELD

This invention relates generally to transport refrigeration systems and, more particularly, to the temporary boosting of capacity for the direct drive compressor during periods in which the effective displacement is insufficient to deliver desired capacity such as during idling and low speed operation of the drive vehicle.

BACKGROUND OF THE INVENTION

Refrigerated vehicles have long been employed in a wide variety of applications including storage and transportation of perishable commodities, particularly produce such as fruit and vegetables, as well as other perishable foods, including processed and frozen or chilled products such as ice cream or the like. The refrigerated vehicles contemplated by the present invention include, for example, trucks, truck trailers, and refrigerated vans.

In such vehicles, it has been common to drive the refrigeration compressor by way of direct drive arrangement with the vehicle engine. While operating at higher speeds as when on the highway, for example, the compressor speed is normally sufficient to provide adequate capacity to the refrigeration system. However, when idling or operating at low speed city delivery conditions, the engine speed, and thus the compressor speed, is sufficiently reduced so as to provide insufficient capacity for the system. In addition, the combination of selectable box temperatures, wide ranging ambient temperatures, and wide engine speed variations, often produce a mismatch between the desired compressor capacity and the actual compressor capacity.

One approach to solving this problem is that of substituting a direct drive compressor with an electrically driven variable speed compressor which, in turn, is operatively connected to an engine driven generator. Although effective, this approach is expensive since the cost of the generator is relatively high. Further, such an approach requires a high electrical demand, and the ac current must be converted to dc current and then back to ac current. There is therefore a substantial cost penalty using such an approach.

Other problems associated with a direct drive compressor during pulldown include those of overloading the compressor especially during periods in which the box is hot. That is, at the start of a pull down condition when the box is 100° F., for example, the direct drive compressor can easily be overloaded and result in clutch failure or otherwise be caused to shut down unless the load is limited. This is normally accomplished by way of a compressor pressure regulator, which is a throttling valve to reduce the flow of refrigerant from the evaporator to the compressor Thus, under the typical pull down operating cycle, during the initial stages when the box is hot, it is necessary to limit the suction pressure and the compressor pressure regulator needs to be in operation. During the later stages of pull down, when the temperature in the box has been reduced to a temperature such as, for example, −20° F., then the density of the suction gas is low, resulting in the direct drive compressor having insufficient capacity to meet the demands.

DISCLOSURE OF THE INVENTION

In accordance with one aspect of the invention, an electrically powered variable speed booster compressor is made to operate in series with the direct drive compressor so as to boost the suction pressure of the direct drive compressor when needed. It should be noted that in the context of this invention the direct drive compressor can be connected to the engine via a coupling, belts, gearbox or by some other mechanical means.

By another aspect of the invention, the booster compressor is used as a pressure limiter to the direct drive compressor when needed such that the compressor pressure regulator can be eliminated.

In the drawings as hereinafter described, a preferred embodiment is depicted; however, various other modifications and alternate constructions can be made thereto without departing from the scope of the invention.

DETAILED DESCRIPTION OF THE INVENTION

Figure 1:
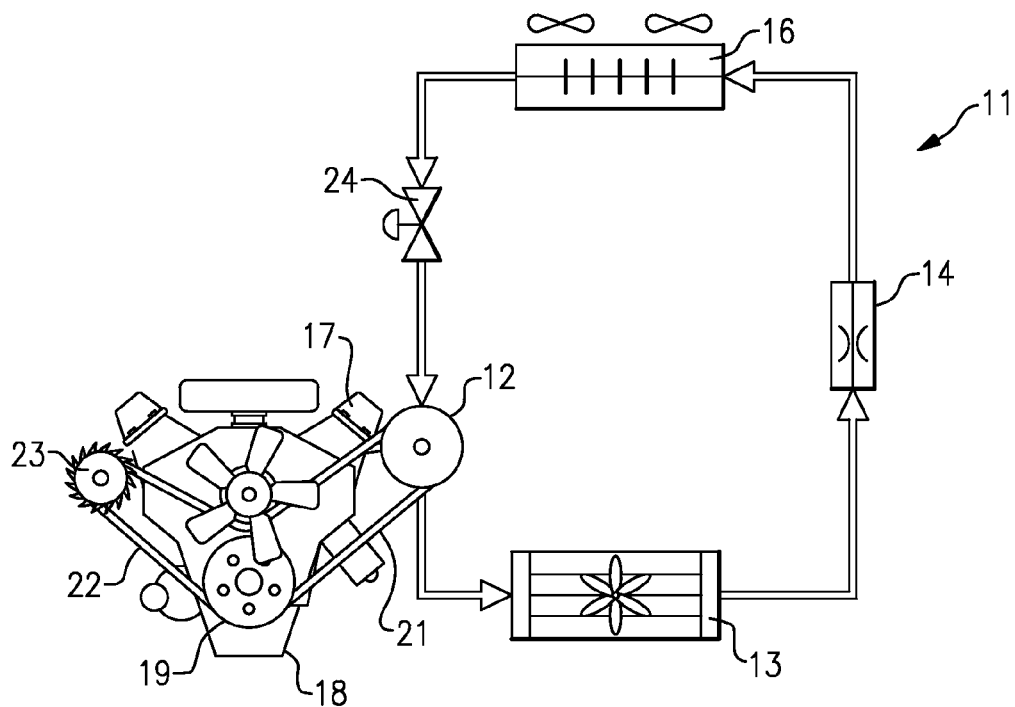
FIG. 1 is a schematic illustration of a direct drive compressor circuit in accordance with the prior art.
Figure 2:
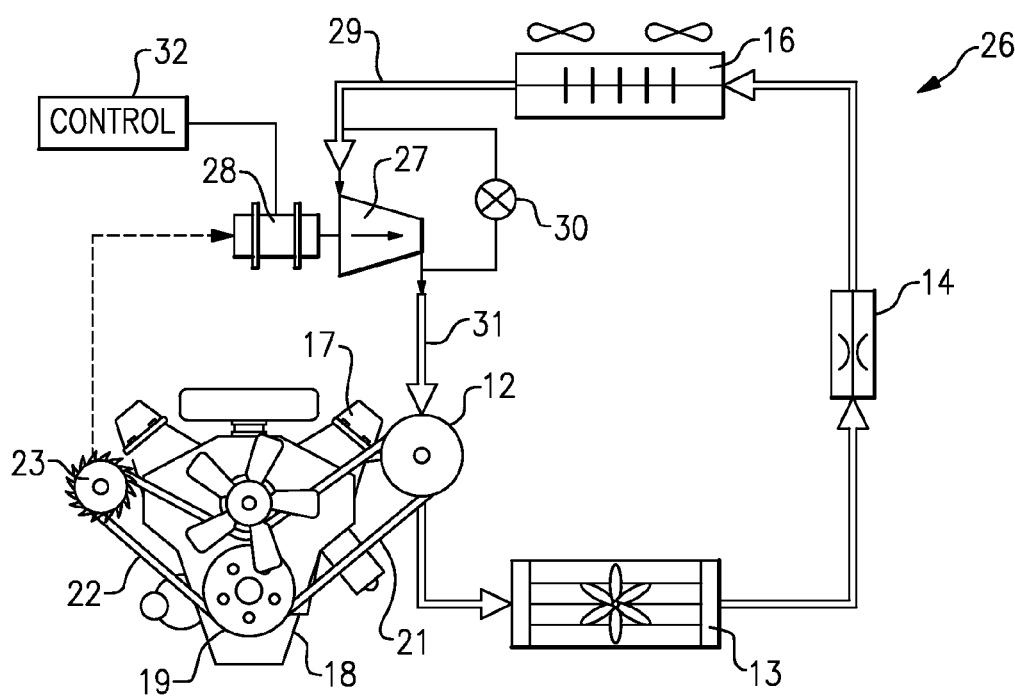
FIG. 2 is a schematic illustration of a direct drive compressor circuitry in accordance with the present invention.

Shown in FIG. 1 is a typical transport refrigeration circuit 11 which includes, in serial flow relationship, a direct drive compressor 12, a condenser 13, an expansion device 14, and an evaporator 16. The transport vehicle (not shown) is driven by a drive engine 17 having a drive shaft 18. The drive shaft 18 is connected by a pulley 18 and a belt 21 to drive the direct drive compressor 12. A similar pulley and belt 24 is connected to drive the generator 23 for producing electrical power to various components on the vehicle such as the lights, battery, gauges, etc.

As may be understood, when the drive engine is driving the vehicle at normal operating speeds such as when on the highway, the drive shaft 18, and thus the direct drive compressor 12, will also be operating at relatively higher speeds. Thus, under those conditions, the refrigerant flow through the refrigerant circuit 11 is sufficient to meet the cooling requirements. However, when the drive engine 17 is idling or otherwise operating at low speeds, the cooling requirements may exceed the cooling capacity delivered by refrigerant circuit 11. In such a case the box temperature will rise above desired level, and, depending on the thermal inertia and duration, may result in product spoilage.

During periods in which the demands for higher capacity are made on the system, such as during pulldown conditions when the box is just loaded or is about to be loaded, and the temperature therein is relatively hot, the direct drive compressor 12 may be overloaded and thereby result in damage to the compressor, clutch, or belt. This can occur even at higher speeds of the drive engine 17. During these conditions, it is necessary to limit the flow of refrigerant to the direct drive compressor 12 and this has traditionally been accomplished by way of a compressor pressure regulator 24. Such regulating valves have been found to be inaccurate and unreliable in practice and often must be field adjusted at the risk of causing a compressor, clutch or belt failure.

In accordance with the present invention, a refrigeration circuit 26 includes the direct drive compressor 12, the condenser 13, the expansion device 14 and the evaporator 16. Further, the direct drive compressor 12 is driven by the drive engine 17 in a manner similar as that described hereinabove. However, in order to meet the demands for higher capacities, a variable speed booster compressor 27, driven by a variable speed motor 28 is provided in the circuit 26 as shown. As will be seen, the booster compressor 27 takes its suction from line 29 from the evaporator 16, and discharges to line 31 which leads to the suction of the direct drive compressor 12. In this manner, the booster compressor 27 operates in series flow relationship with the direct drive compressor 12 in order to regulate capacity of the system 26.

The variable speed drive motor 28 receives its electrical power from the generator 23 and is controlled by the control 32 to operate at the appropriate speed to match the system requirements. In this way, the booster compressor speed can be increased during periods of high capacity demands increasing the pressure rise across this compressor. When the high capacities are no longer required, the control can operate to turn the drive motor 28 off and allow the booster compressor to "free wheel" in accordance with the gas flow and allow the direct drive compressor 12 to operate by itself. In this regard, it should be recognized that a screw compression or a centrifugal compressor will "free wheel", whereas a rotary, scroll or reciprocating compressor will not, in which case it may be necessary to provide a bypass around the compressor during these periods of operation. This configuration needs to be shown on the drawing and indicated in the claims.

In addition to the advantages of the booster compressor 27 as described hereinabove, it should be recognized that the pressure regulator 24 can be eliminated from the refrigeration circuit. That is, the booster compressor 27 will not only provide the function of boosting the capacity of the direct drive compressor 12 but will also act to regulate the flow of refrigerant to the direct drive compressor 12 such that it does not become overloaded. Such regulation would be effected by powered operation of the booster compressor at a speed that would provide a pressure drop across the booster compressor which would in turn reduce the pressure from the evaporator to the direct drive compressor. In this way, the pressure to the direct drive compressor can be limited to a predetermined desirable level.

Although the present invention has been particularly shown and described with reference to one embodiment as illustrated by the drawings, it will be understood by one skilled in the art that various changes in detail may be made thereto without departing from the scope of the invention as defined by the claims.

I claim:

1. A vapor compression circuit for a transport refrigeration system of the type having in serial flow relationship a condenser, an expansion device, an evaporator and a compressor, wherein the compressor is directly driven by an engine, comprising:
   a variable speed booster compressor operatively connected in the refrigeration circuit between the evaporator and the direct drive compressor;
   a variable speed electric motor drivingly connected to said booster compressor and electrically connected to a generator driven by the engine; and
   a bypass circuit for the flow of refrigerant around said booster compressor during periods in which said booster compressor is not in operation.

2. The vapor compression circuit as set forth in claim 1 and including a control for operating said electric motor to control pressure change across the variable speed booster compressor according to the requirements of the system.

3. The vapor compression circuit as set forth in claim 2 wherein said control is operable to vary the speed of the electric motor in relation to the capacity needs of the system.

4. The vapor compression circuit as set forth in claim 1 wherein said control is operable to operate said booster compressor at speeds which limit the pressure to the direct drive compressor to a predetermined limit.

5. A method of operating a vapor compression circuit for a transport refrigeration system of the type having in serial flow relationship a condenser, an expansion device, an evaporator and a compressor, wherein the compressor is directly driven by the engine, comprising:
   providing a variable speed booster compressor operatively connected in a refrigeration circuit between the evaporator and the direct drive compressor;
   providing an electric motor drivingly connected to said booster compressor and electrically connected to a generator driven by the engine;
   providing a control for operating said electric motor and said variable speed booster compression to boost the system capacity during periods in which the direct drive compressor exhibits insufficient capacity to meet the needs of the system; and
   providing a bypass circuit for the flow of refrigerant around said booster compressor during periods in which it is not in operation.

6. The method as set forth in claim 5 wherein said control varies the speed of the electric motor in proportion to the capacity needs of the system.

7. The method as set forth in claim 5 further comprising controlling the speed of said booster compressor such that the pressure to said directly drive compressor does not exceed a predetermined limit.

* * * * *